(12) United States Patent
Tsai et al.

(10) Patent No.: US 9,068,056 B2
(45) Date of Patent: Jun. 30, 2015

(54) METHOD FOR FORMING COMPOSITE MATERIALS

(75) Inventors: Tsung-Yen Tsai, Taoyuan County (TW); Shao-Wen Lu, Pingtung County (TW); Wei-Chuan Shiu, Pingtung County (TW); Syuan-Ci Su, Taoyuan County (TW); Tzu-Fang Chen, Taoyuan County (TW); Chao-Chen Hsu, Taoyuan County (TW)

(73) Assignee: Chung Yuan Christian University, Taoyuan County (TW)

( * ) Notice: Subject to any disclaimer, the term of this patent is extended or adjusted under 35 U.S.C. 154(b) by 878 days.

(21) Appl. No.: 12/858,910

(22) Filed: Aug. 18, 2010

(65) Prior Publication Data

US 2011/0288219 A1 Nov. 24, 2011

(30) Foreign Application Priority Data

May 24, 2010 (TW) .................. 99116472 A

(51) Int. Cl.
*C08K 3/10* (2006.01)
*C08K 3/22* (2006.01)
*C08K 9/08* (2006.01)

(52) U.S. Cl.
CPC .... *C08K 3/22* (2013.01); *C08K 9/08* (2013.01)

(58) Field of Classification Search
USPC .......................................... 524/436, 437, 407
See application file for complete search history.

(56) References Cited

U.S. PATENT DOCUMENTS 7,087,255 B2 * 8/2006 McGrew et al. .................. 426/5

OTHER PUBLICATIONS

Martinez-Gallegoe et al., In situ microwave-assisted polymerization of polyethylene terephthalate in layered double hydroxides, Journal of Applied Polymer Science, vol. 109, 2008, 1388-1394.*
John Duffus, "Heavy Metals"—a meaningless term? (IUPAC technical report), Pure Appl. Chem., vol. 74, No. 5, pp. 793-807, 2002.*
Lee et al., Thermomechanical properties and crystallization behavior of layered double hydroxide/poly(ethylene terephthalate) nanocomposites prepared by In-situ polymerization, Journal of polymer science: part B: polymer physics, vol. 45, 28-40, 2007.*
Martinez-Gallegos et al., Dispersion of layered double hydroxides in poly(ethylene terephthalate) by in situ polymerization and mechanical grinding, Applied Clay Science 45 (2009) 44-49.*
Meyer et al., Transesterification of methyl benzoate and dimethyl terephthalate with ethylene glycol over basic zeolites, Applied Catalysis A: General 178 (1999) 159-166.*
Shumaker et al., Biodiesel synthesis using calcined layered double hydroxide catalysts, Applied Catalysis B: Environmental 82 (2008) 120-130.*

* cited by examiner

*Primary Examiner* — Wenwen Cai
(74) *Attorney, Agent, or Firm* — Muncy, Geissler, Olds & Lowe, P.C.

(57) ABSTRACT

Disclosed is layered double hydroxides (LDH) used to catalyze the polymerization of polyethylene terephthalate (PET). The LDH of a catalyst amount may efficiently reduce the PET polymerization period and further be uniformly blended into the PET product to form composites. Compared with the pure PET, the composite including LDH has better properties such as mechanical properties, linear expansion coefficient, barrier, thermal stability, and transparency. In addition, the LDH in the composite is safer than conventional heavy metal catalysts, especially when applied to food or drink packages.

5 Claims, 2 Drawing Sheets

METHOD FOR FORMING COMPOSITE MATERIALS

CROSS REFERENCE TO RELATED APPLICATIONS

This Application claims priority of Taiwan Patent Application No. 99116472, filed on May 24, 2010, the entirety of which is incorporated by reference herein.

BACKGROUND OF THE INVENTION

1. Field of the Invention

The invention relates to a polyethylene terephthalate, and more particularly to a catalyst for polyethylene terephthalate polymerization and a composite material formed by the polyethylene terephthalate polymerization.

2. Description of the Related Art

Polyethylene terephthalate (PET) has been popularly utilized for food and drink packages, having an annual growth rate of about 15 to 20%. PET containers have largely replaced PVC bottles and metal cans.

One of the PET forming methods is reversible bis-hydroxy ethylene terephthalate (BHET) polymerization. Ethylene glycol is removed by increasing the reaction temperature to control the molecular weight of the PET. However, PET degradation occurs as the reaction period increases. To reduce the reaction period, generally, a heavy metal catalyst is added to advance polymerization. However, residual heavy metal catalyst in the PET products is harmful to the health of mammals, especially when applied for food or drink packages. Thus, development of rapid PET polymerization without the addition of heavy metal catalysts is desirable.

Additionally, development of a PET material with high mechanical property, low linear expansion coefficient, high barrier, high thermal stability, high flame retardancy and/or high transparency is also popular. Generally, nano-level inorganic materials are blended into the PET to form nano-level composite materials. However, nano-level inorganic material aggregation often occurs, resulting in uneven blending, deteriorating product quality. Thus, development of a method for uniformly blending the nano-level inorganic material into the PET to form a nano-level composite material is desirable.

BRIEF SUMMARY OF THE INVENTION

One embodiment of the invention provides a method for forming a composite material, comprising uniformly blending a polyethylene terephthalate (PET) monomer and a layered double hydroxide (LDH) to form a mixture, and polymerizing the mixture by heating to form a composite material of polyethylene terephthalate and the layered double hydroxide.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

One embodiment of the invention provides a method for forming a composite material. First, a polyethylene terephthalate (PET) monomer and a layered double hydroxide (LDH) are uniformly blended to form a mixture. The polyethylene terephthalate monomer may comprise ethylene glycol, terephthalic acid, bis-hydroxy ethylene terephthalate (BHET) or a combination thereof. The layered double hydroxide may comprise magnesium aluminum layered double hydroxide ($[Mg_2Al(OH)_6]NO_3 \cdot H_2O$), lithium aluminum layered double hydroxide ($[LiAl_2(OH)_6]NO_3 \cdot H_2O$), zinc chromium layered double hydroxide ($[Zn_2Cr(OH)_6]NO_3 \cdot H_2O$), zinc aluminum layered double hydroxide ($[Zn_2Al(OH)_6]NO_3 \cdot H_2O$), calcium aluminum layered double hydroxide ($[Ca_2Al(OH)_6]NO_3 \cdot H_2O$) or a combination thereof. In one embodiment, the polyethylene terephthalate monomer and the layered double hydroxide have a weight ratio of about 100:0.1 to 100:1.

In one embodiment, the layered double hydroxide may further be grafted with an amphoteric ionic surfactant to facilitate more uniform blending of the layered double hydroxide in the subsequently polymerized PET. The amphoteric ionic surfactant may comprise sulfanilic acid salt, alkyl sulphates, alkyl ether sulphates, alkaryl sulphonates, alkanoyl isethionates, alkyl succinates, alkyl sulphosuccinates, N-alkoxyl sarcosinates, alkyl phosphates, alkyl ether phosphates, alkyl ether carboxylates or alpha-olefin sulphonates.

Finally, the mixture is polymerized by heating to form a composite material of polyethylene terephthalate and the layered double hydroxide. A bis-hydroxy ethylene terephthalate (BHET) polymerization is exemplarily shown in Formula (I). In one embodiment, the intrinsic viscosity (IV) of the PET product is 0.4. The layered double hydroxide is uniformly blended in the composite material because of the initial uniform blending of the PET monomer with the layered double hydroxide, effectively improving some properties of the composite material, such as and especially transparency. Additionally, the layered double hydroxide is also utilized as a catalyst to effectively reduce the PET polymerization period. Additionally, the layered double hydroxide catalyst is safer than conventional heavy metal catalysts. The invention discloses a layered double hydroxide, utilized as the catalyst of the PET polymerization, and a PET/layered double hydroxide composite material with improved mechanical properties, linear expansion coefficient, barrier, thermal stability, and transparency and/or a polymerization period.

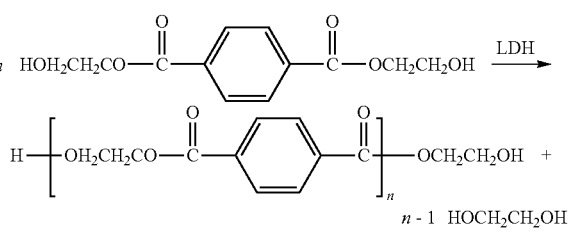

Formula (I)

EXAMPLE 1

Figure 1:
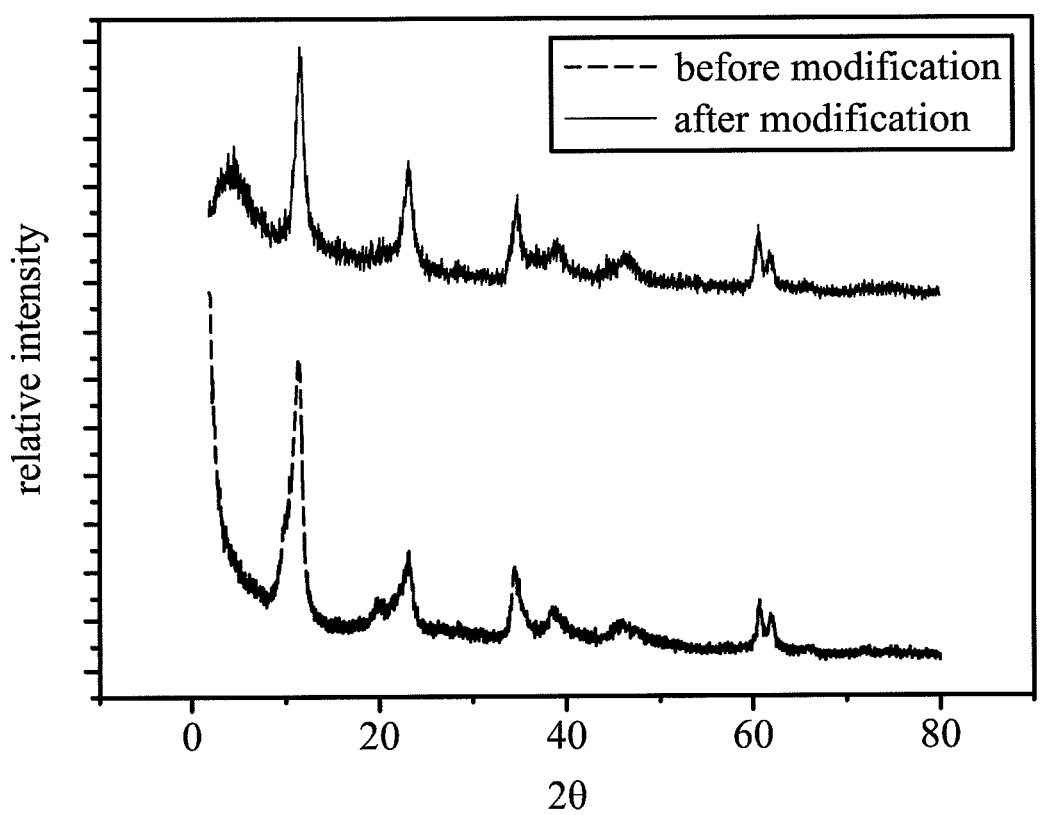
FIG. 1 shows the XRD of the magnesium aluminum layered double hydroxide before and after modification.

Preparation of Magnesium Aluminum Layered Double Hydroxides 34.65 g of $Mg(NO_3)_3 \cdot 3H_2O$ and 25.38 g of $Al(NO_3)_3 \cdot 9H_2O$ were dissolved in 240 ml of deionized water to form a solution. 21.6 g of NaOH was then added to the solution to adjust the pH thereof to about 10 to form a basic solution. Next, the basic solution was rapidly agitated under room temperature for 2 mins and then placed in a high-pressure autoclave to react at 80° C. for 6 hrs to form a mixture. Next, the mixture was washed with deionized water. After centrifugation for several times, the mixture was completely dried in a freeze-drying machine. The dried mixture was then milled to form 13.8 g of magnesium aluminum (MgAl—$NO_3$) layered double hydroxide powder. The XRD diffraction thereof is shown in FIG. 1.

EXAMPLE 2

Figure 2:
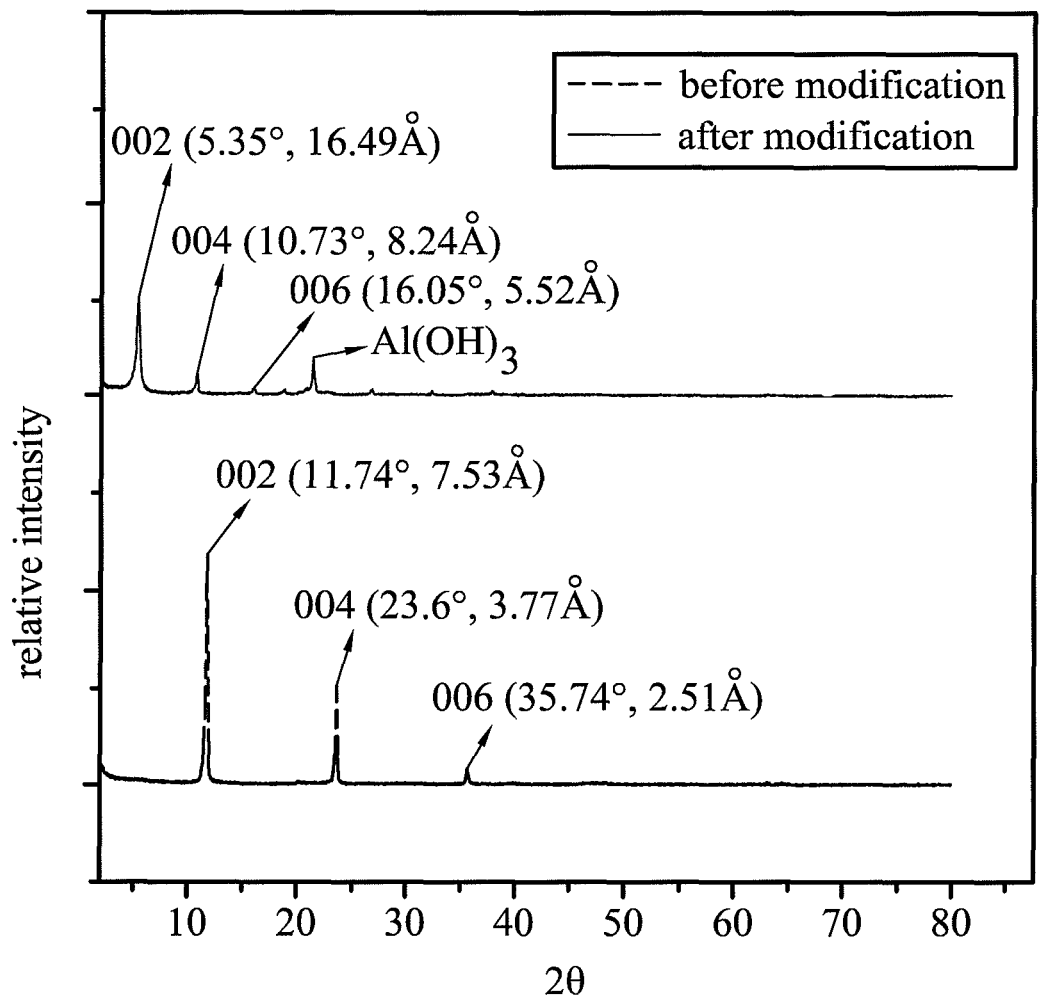
FIG. 2 shows the XRD of the lithium aluminum layered double hydroxide before and after modification.

Preparation of Lithium Aluminum Layered Double Hydroxides 4.2 g of $LiNO_3 \cdot 3H_2O$ and 45.64 g of $Al(NO_3)_3 \cdot 9H_2O$ were dissolved in 200 ml of deionized water to form a solution. 21.5 g of NaOH was then added to the solution to adjust the pH thereof to about 13 to form a basic solution. Next, the basic solution was rapidly agitated under room temperature for 60 mins and then placed in a high-pressure autoclave to react at 100° C. for 6 hrs to form a mixture. Next, the mixture was washed with deionized water. After centrifugation for several times, the mixture was completely dried in a freeze-drying machine. The dried mixture was then milled to form lithium aluminum (LiAl—$NO_3$) layered double hydroxide powder. The XRD diffraction thereof is shown in FIG. 2.

EXAMPLE 3

Modification of Magnesium Aluminum Layered Double Hydroxides

The powder prepared by Example 1 was calcined at 600° C. for 24 hrs in a high-temperature oven to form magnesium aluminum layered double oxide (LDO). Next, 30.06 g (1.5 times of the AEC of the magnesium aluminum layered double hydroxide) of sulfanilic acid salt (SAS) as a modifier was dissolved in 50 ml of water to form a modifier aqueous solution. 10 g of magnesium aluminum layered double oxide was then slowly added to the modifier aqueous solution and then the modifier aqueous solution was placed in a high-pressure autoclave to react at 100° C. overnight with agitation to form a mixture. The mixture was then washed with deionized water. After centrifugation for several times, the mixture was completely dried in a freeze-drying machine. The dried mixture was then milled to form magnesium aluminum sulfanilic acid salt (Mg—Al-SAS) layered double hydroxide powder. The XRD diffraction thereof is shown in FIG. 1.

EXAMPLE 4

Modification of Lithium Aluminum Layered Double Hydroxides

The mixture prepared by Example 2 was washed with deionized water. After centrifugation for several times, the mixture was added to 150 ml of deionized water to form a LDH aqueous solution. Next, the pH of the LDH aqueous solution was adjusted by adding nitric acid to 7 to form a solution. The solution was then added to 70 ml of SAS aqueous solution containing 10.25 g of SAS and stirred for 24 hrs to form a second mixture. The second mixture was washed with deionized water. After centrifugation for several times, the second mixture was completely dried in a freeze-drying machine. The dried second mixture was then milled to form lithium aluminum sulfanilic acid salt (Li—Al-SAS) layered double hydroxide powder. The XRD diffraction thereof is shown in FIG. 2.

Comparative Example 1

500 g of pure bis-hydroxy ethylene terephthalate (BHET) was polymerized by heating to 270° C. for 490 mins to form a PET product. The intrinsic viscosity (IV) of the PET product was 0.4. The storage modulus (mechanical property) thereof was 1,854 MPa. The linear expansion coefficient (size stability) thereof was 567 ($\alpha 1$) and 3020 ($\alpha 2$). The barrier thereof was examined by ultraviolet light. Other properties or dates, for example, dispersivity is shown in Table 1.

EXAMPLE 5

One part by weight of the magnesium aluminum sulfanilic acid salt layered double hydroxide (Mg—Al-SAS-LDH) prepared by Example 3 and nine parts by weight of bis-hydroxy ethylene terephthalate (BHET) were blended and melted at 106° C. with uniform agitation to form a mixture. After cooling to room temperature, the mixture was milled to form powder. Next, the powder was uniformly blended with another BHET and reacted at 270° C. to form a composite material of the magnesium aluminum layered double hydroxide and the PET. The properties thereof are shown in Table 1. The results indicate that the PET polymerization period was substantially reduced by adding the LDH catalyst and the properties of the composite material were also improved.

TABLE 1

|  | Comparative Example 1 | Example 5-1 | Example 5-2 | Example 5-3 |
|---|---|---|---|---|
| LDH (g) | 0 | 0.5 | 2.5 | 5 |
| LDH/BHET powder (g) | 0 | 5 | 25 | 50 |
| Other BHET (g) | 500 | 495 | 490 | 450 |
| Polymerization period (min) | 490 | 100 | 140 | 200 |
| IV (dL/g) | 0.4 | 0.4 | 0.4 | 0.4 |
| Dispersivity (TEM) | — | Exfoliation | Exfoliation | Exfoliation |
| Storage modulus (MPa) | 1,854 | 2,912 | 3,141 | 3,687 |
| Anti-ultraviolet (%) | — | 9.5 | 15 | 28 |
| Linear expansion coefficient ($\alpha 1$, ppm) | 567 | 248 | 133 | 95.6 |
| Linear expansion coefficient ($\alpha 2$, ppm) | 3,020 | 1,790 | 1,310 | 829 |

EXAMPLE 6

One part by weight of the lithium aluminum sulfanilic acid salt layered double hydroxide (Li—Al-SAS-LDH) prepared by Example 4 and nine parts by weight of bis-hydroxy ethylene terephthalate (BHET) were blended and melted at 106° C. with uniform agitation to form a mixture. After cooling to room temperature, the mixture was milled to form powder. Next, the powder was uniformly blended with another BHET and reacted at 270° C. to form a composite material of the lithium aluminum layered double hydroxide and the PET. The properties thereof are shown in Table 2. The results indicate that the PET polymerization period was substantially reduced by adding the LDH catalyst and the properties of the composite material were also improved.

TABLE 2

|  | Comparative Example 1 | Example 6-1 | Example 6-2 | Example 6-3 |
| --- | --- | --- | --- | --- |
| LDH (g) | 0 | 0.5 | 2.5 | 5 |
| LDH/BHET powder (g) | 0 | 5 | 25 | 50 |
| Other BHET(g) | 500 | 495 | 490 | 450 |
| Polymerization period (min) | 490 | 30 | 70 | 130 |
| IV (dL/g) | 0.4 | 0.36 | 0.28 | 0.31 |
| Dispersivity (TEM) | — | Exfoliation | Exfoliation | Exfoliation |

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for forming a composite material, comprising:
   uniformly blending a polyethylene terephthalate monomer and a catalyst consisting of a layered double hydroxide to form a mixture; and
   polymerizing the polyethylene terephthalate monomer in the presence of the layered double hydroxide as the sole polymerization catalyst by heating to form the composite material of polyethylene terephthalate and the layered double hydroxide.

2. The method for forming a composite material as claimed in claim 1, wherein the polyethylene terephthalate monomer and the layered double hydroxide have a weight ratio of 100:0.1 to 100:1.

3. The method for forming a composite material as claimed in claim 1, wherein the polyethylene terephthalate monomer comprises ethylene glycol, terephthalic acid, bis-hydroxy ethylene terephthalate (BHET) or a combination thereof.

4. The method for forming a composite material as claimed in claim 1, wherein the layered double hydroxide comprises magnesium aluminum layered double hydroxide, lithium aluminum layered double hydroxide, zinc chromium layered double hydroxide, zinc aluminum layered double hydroxide, calcium aluminum layered double hydroxide or a combination thereof.

5. The method for forming a composite material as claimed in claim 1, further comprising modifying the layered double hydroxide by an amphoteric surfactant.

* * * * *